June 24, 1930.    R. E. KIMBALL    1,765,429
SHOCK ABSORBER
Filed April 9, 1927
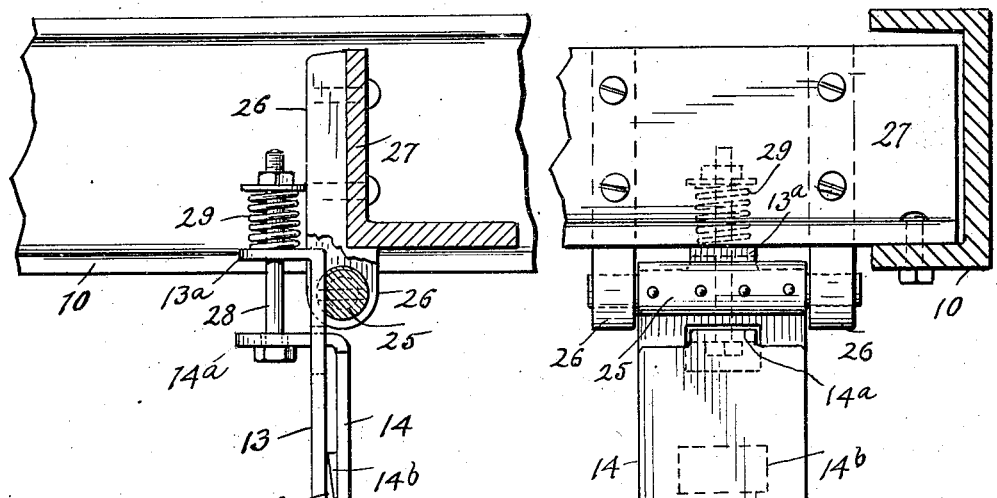
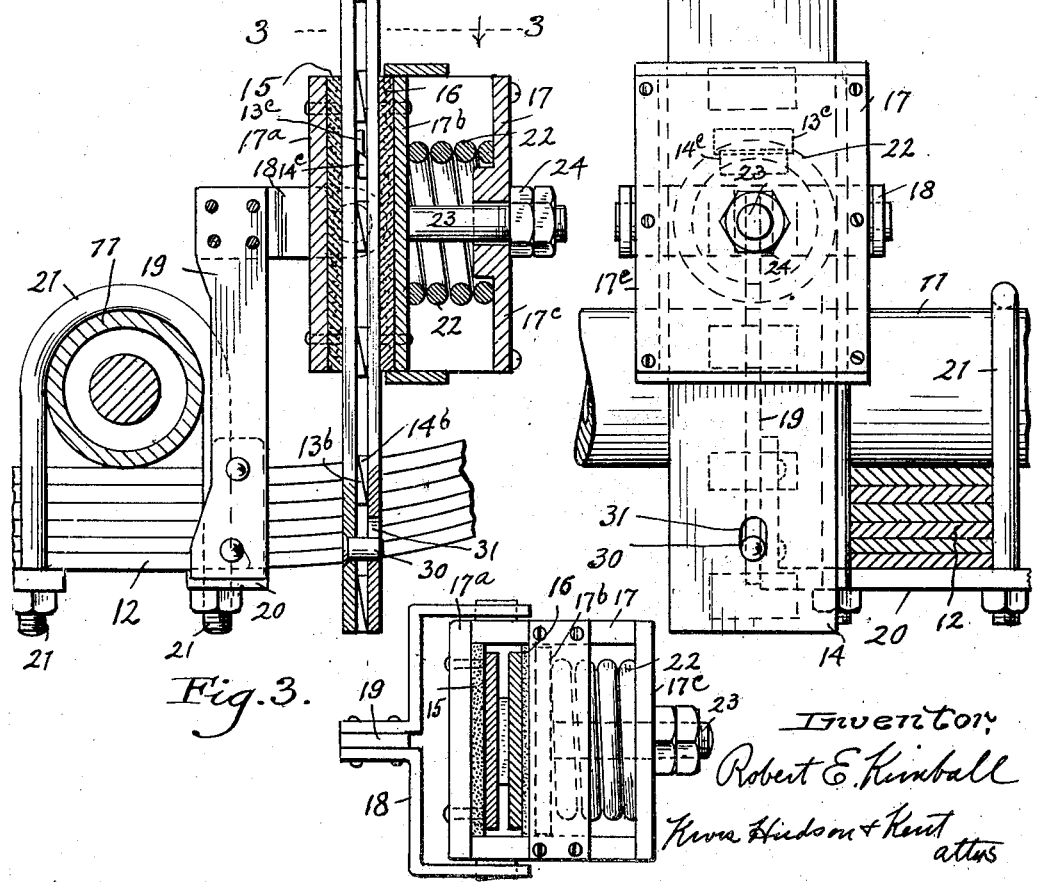

Patented June 24, 1930

1,765,429

UNITED STATES PATENT OFFICE

ROBERT E. KIMBALL, OF CLEVELAND, OHIO

SHOCK ABSORBER

Application filed April 9, 1927. Serial No. 182,222.

This invention relates to shock absorbers of the "snubber" type adapted particularly for use on motor vehicles.

The principal object of the present invention is to provide a device of this character which improves the riding qualities of the car and which is more effective and satisfactory in operation than those employed heretofore. More particularly, it is the aim of the invention to provide a shock absorber which will snub or check sudden rebounds but which has no effect on and in fact is functionless in so far as the relatively minor and gentler relative movements are concerned between the car body and wheels.

More specifically considered, it is the aim of the invention to provide a shock absorber or snubber composed of relatively movable members connected respectively to the axle and the chassis frame, which members are adapted to frictionally retard or check upward or rebounding movements of the car body only when such movements reach or exceed a predetermined or given velocity or when such movements have a given or predetermined acceleration. When the movements are relatively slow, the friction members do not function and in fact are substantially out of engagement. In this manner, wear on the friction material is reduced to a minimum and the life of the friction material is greatly extended, this being a distinct advantage over devices of this character used at the present time wherein the friction members are constantly in action and, therefore, have to be relatively frequently renewed.

In carrying out my invention, I provide a shock absorber or snubber composed of members which are connected, respectively, to the axle and chassis frame and which are constantly moved relatively without frictional engagement while the car is in action, there being no retarding effect at any time by downward movement of the axle relative to the chassis frame and no frictional engagement or retarding effect on upward movement of the chassis frame or car body until the upward movement takes place with a given acceleration whereupon a frictional action of a predetermined amount takes place so as to obtain the desired rebound checking action.

Although these results may be obtained in different ways, in the form of the invention now best known to me, the relatively movable friction members are brought from a functionless relationship which normally exists to one wherein they not only frictionally engage each other but engage under a pressure of a fixed and predetermined amount by the effect of inertia on one of the members which is caused to move relative to another member only when upward movement of the car body is sudden enough to cause this relative movement by the effect of inertia.

The invention may be further briefly summarized as consisting of certain novel constructions and arrangements of parts which will be described in the specification and set forth in the appended claims.

In the accompanying sheet of drawings which illustrates the preferred embodiment of the invention:

Fig. 1 is a sectional view showing my improved shock absorber applied to a vehicle, the device itself being shown partly in section and partly in elevation, the section being taken at right angles to the axle; Fig. 2 is a sectional view at right angles to the section of Fig. 1 and showing the shock absorber in elevation; and Fig. 3 is a sectional view substantially along the line 3—3 of Fig. 1.

Referring now to the drawings, 10 represents one of the side members of the chassis frame, 11 is an axle which may be a rear axle and 12 is a leaf spring of the car or vehicle.

In the embodiment illustrated, the parts connected to the chassis frame include two bars or straps 13 and 14 which are arranged side by side and are adapted to move vertically or in an endwise direction between two strips of friction material 15 and 16 supported by a box-like member or casing 17 suitably connected with the axle. In this instance, the box or casing 17 is pivotally connected to a fork 18, see Fig. 3, secured to a strap 19 attached to a bracket 20 secured to the under side of the spring 12 by U-bolts 21 extending about the axle housing as indicated in Figs.

1 and 2. Any other suitable means for making the mechanical connection, however, may be employed.

The strips 15 and 16 of friction material which may be brake lining material are secured, respectively, to the back wall 17ª of the box 17 and to a wall 17ᵇ which is engaged by a stiff spring herein shown as a coil spring 22 arranged between the wall 17ᵇ and the front wall 17ᶜ of the box. The wall 17ᵇ carries a bolt shank 23 which extends through the spring and through the front wall 17ᶜ of the box and has its outer end threaded to accommodate a pair of nuts 24 which can be adjusted to vary the position of the friction member 16 with reference to the opposing friction member 15 with spring 22 of a given size provided to cause a predetermined frictional engagement on the straps 13 and 14. There will be no occasion to adjust the nuts 24 except to compensate for wear on the friction members 15 and 16. Referring now to the straps 13 and 14, the strap 13 at all times partakes of the up and down movement of the chassis frame but this strap is preferably pivotally connected to the chassis frame and this is accomplished, in this instance, by securing it by rivets or otherwise to the flat face of a pintle 25 journaled in a pair of bearing members 26 attached to a member 27 which, in turn, forms a part of or is secured to the chassis frame. In the embodiment illustrated, this supporting member 27 is in the form of an angle which is adapted to extend between and be secured to the side members of the chassis frame.

The other strap 14 is supported by the strap 13 but yieldingly supported from it and in this instance, the upper end of strap 14 which is bent laterally, as at 14ª is supported on the lower end of a bolt 28 which passes freely through the upper laterally bent end 13ª of strap 13, there being between the upper end of the bolt 28 and the laterally bent end 13ª of strap 13 a relatively weak spring 29. That is to say, strap 14 is supported from strap 13 through spring 29 and when in its normal position with reference to strap 13 the straps are a minimum distance apart, this distance being such that the straps and friction members 15 and 16 may move relatively up and down without frictional resistance. It will be observed, however, that the adjacent sides of the straps 13 and 14 are provided with complementary wedge pieces 13ᵇ and 14ᵇ and when strap 14 is at its normal position with reference to strap 13, the wedge pieces permit the two straps to occupy the relatively narrow space which permits the free movement referred to above relative to the friction members.

The straps 13 and 14 occupy the relative positions described above and shown in Fig. 1 of the drawings not only when the car is stationary but while it is in motion provided the rate of speed or the condition of the roadway does not result in a rebounding or upward motion of the car body at more than a predetermined rate or with more than a predetermined acceleration. Thus though the car body and axle may move relatively up and down, there is normally no snubbing action to this movement and, therefore, no wear on the friction members.

However, when the control of the upward movement of the car body is needed as when a sudden rebound occurs, the shock absorber becomes immediately effective to frictionally retard the rebound and this is accomplished by a relative lengthwise movement of the straps 13 and 14 due to the inertia of the spring supported strap 14 resulting in the straps being wedged apart sufficiently to bring them into frictional engagement with the friction members 15 and 16 and as soon as this occurs, strap 14 is pulled down by the downward drag exerted on it by friction member 16, the downward movement being limited by a suitable stop which, in this instance, is in the form of a pin or stud 30 carried by one of the straps and projecting into a slot 31 of the other strap, the length of the slot being such as to permit just the desired separation of the straps. This results in a definite frictional resistance being exerted by the friction members 15 and 16 on the straps and this is directly proportional to the strength of the spring 22 which is made strong enough to give the desired snubbing action.

The velocity or acceleration of the upward movement of the car body which is necessary to cause relative lengthwise movement of the straps 13 and 14 to result in the frictional engagement with the friction members 15 and 16 as explained above—in other words, the suddenness of the upward movement of the car body which will allow strap 14 by its inertia to tend to remain stationary so as to bring the wedges into action will depend upon the strength of spring 29 which is so selected as is also the strength of spring 22 to produce the desired snubbing action when the same is needed for easy riding.

It is desirable, if not necessary, that the two straps 13 and 14 be normally held in their relatively narrow or contracted relationship to prevent rattling and possible drag by the friction member 16 on the strap 14. This is accomplished in this instance by two lugs 13ᶜ and 14ᶜ attached to the contiguous faces of the straps 13 and 14 and having overlapping inclined ends reversely tapered with respect to the wedges 13ᵇ and 14ᵇ, the effect of the overlapping inclined ends of the lugs being to normally hold the straps the minimum distance apart so that they may move freely between the friction members 15 and 16.

When a sudden rebound occurs, due to the effect of inertia on strap 14, the straps are moved relatively and wedged apart and thereby caused to be brought into a certain frictional engagement with the friction members 15 and 16. This immediately causes friction member 16 to exert a drag on strap 14 thereby causing the wedges to separate the straps the maximum amount (determined by the length of the slot 31), resulting in the maximum frictional engagement between the straps and the friction members under the full pressure of spring 22. On the reversal of movement between the axle and chassis following the sudden rebound referred to, the lugs 13° and 14° again function to restore and hold the straps in their narrow or contracted relationship until a rebound of sufficient acceleration again occurs to bring the shock absorber into action in the manner explained above.

Not only are the riding qualities of the car improved by reason of the fact that the snubber is effective to check the upward movement of the car body when the snubbing action is desired, but it will be seen that at no time is the snubber brought into action by a downward movement of the axle relative to the car body or chassis frame as is the case with all snubbers or shock absorbers of the friction type at present in use. The fact that the axle may move downward relative to the car body without having its downward movements snubbed in itself tends to permit the car body to remain at a more uniform height with reference to the ground over which the car is passing.

While I have shown one embodiment of the invention which, in practice, has proven to be effective and which illustrates the principle of the invention, the construction may be varied in details and other ways of carrying out the principle may occur to one skilled in the art and I, therefore, do not desire to be confined to the details or arrangements shown but aim in my claims to cover all modifications which do not involve a departure from the spirit and scope of the invention.

Having thus described my invention, what I claim is:

1. In a shock absorber, a pair of relatively movable friction members adapted to be connected respectively to the axle and chassis frame of a vehicle, and means responsive to a relative movement of a predetermined acceleration or greater between said members of the vehicle for causing said friction members to frictionally resist such movement by a definite resistance.

2. In a shock absorber for checking the rebound between two relatively movable parts, a pair of friction members normally inactive for relative movement of any amplitude between said parts and having means responsive to the movement of one of said parts in a given direction and of a predetermined acceleration or greater to cause frictional engagement between said members under a definite pressure.

3. In a shock absorber for checking sudden rebounds between two relatively movable parts, a pair of friction members, and spring means for causing said members to frictionally engage under predetermined pressure, said spring means being rendered effective on the occurrence of a relative movement of said parts of a predetermined acceleration.

4. In a shock absorber for checking sudden rebounds between two relatively movable parts, a pair of friction members, and spring means for causing said members to frictionally engage under predetermined pressure, said spring means being normally ineffective and being rendered effective by the effect of inertia on one of the parts of the shock absorber when relative movement of a given acceleration and in a given direction occurs between said parts.

5. In a shock absorber for checking the rebound between two relatively movable parts, friction means connected to one of said parts, friction means connected to the other of said parts, said friction means being normally inactive on the occurrence of relative movements between said parts of less than a given acceleration, the friction means connected to one of said parts including an element movable by the effect of inertia relative to another element to cause frictional engagement of a definite amount between said two friction means when a rebound movement of predetermined acceleration or greater occurs between said parts.

6. In a shock absorber for checking sudden rebound between two parts, two sets of friction members, one connected to one of said parts and one to the other, said friction members being normally freely relatively movable, and a spring adapted under certain conditions to cause said friction members to frictionally engage each other, one of said sets comprising parts relatively movable by the effect of inertia on the occurrence of a movement of given acceleration to permit the spring to act.

7. In a shock absorber for checking sudden rebound between two parts, two relatively movable friction means adapted to be connected respectively to said relatively movable parts and normally freely movable relatively, a spring for causing frictional engagement between said means, one of said friction means being composed of two members, one supported so that it may move relative to the other by the effect of inertia thereon thereby serving to cause the friction means to be engaged under predetermined pressure by said spring.

8. In a shock absorber for checking sudden rebound between two relatively movable parts, friction means connected to one of said parts and friction means connected to the other of said parts, the friction means being normally freely relatively movable, a normally inactive spring for causing predetermined pressure between the two friction means, one of said friction means comprising two members relatively movable in an endwise direction by the effect of inertia acting on one of them when a sudden rebound occurs between said relatively movable parts to cause said spring to act.

9. In a shock absorber for checking sudden rebound between two relatively movable parts, two pairs of friction members, one pair being connected to one of said parts and the other pair being connected to the other of said parts and one pair being movable between the other pair, the members of one pair being relatively movable by the effect of inertia on one of them when a sudden rebound occurs, so as to vary the effective width thereof, and a spring for pressing the friction members together, said spring being rendered effective on the occurrence of said relative movement.

10. In a shock absorber for checking sudden rebound between two relatively movable parts, a pair of friction members connected to one of said parts, a second pair of friction members connected to the other of said parts and normally movable freely between the first pair, said second pair of friction members being relatively movable and one being yieldingly supported so that by the effect of inertia thereon said two members will move relatively on the occurrence of a rebound of predetermined acceleration, and a spring which is normally inactive and which is rendered effective to press the friction members together under predetermined pressure on the occurrence of said relative movement.

11. In a shock absorber for checking sudden rebound between two relatively movable parts comprising a friction member connected to one of said parts and a two-part member connected to the other, one of said parts being yieldingly supported so that it may move relative to the other by the effect of inertia thereon and said yieldingly supported part being normally movable close to but freely relative to the friction member, a normally inactive spring adapted to press the members together, said yieldingly supported member when moved relative to the companion member by the effect of inertia being brought in contact with the friction member and by the latter moved to a position relative to the companion member, such that it is engaged by the friction member under the full pressure of the spring.

12. A shock absorber for checking sudden rebounds between two relatively movable parts comprising a friction member connected to one of the parts and a two-part member connected to the other, and a normally inactive spring associated with the friction member, one of the parts of said two-part member being normally freely movable close to the friction member and by the effect of inertia thereon on the occurrence of a sudden rebound being spread from the companion member and moved into frictional contact with the friction member and by the latter being still further spread from the companion member so as to enable the friction member to engage the same under the full pressure of the spring.

13. A shock absorber for checking sudden rebounds between two relatively movable parts comprising a friction member connected to one of said parts and a two-part member connected to the other, one of the parts of the two-part member being yieldingly supported whereby it may move relative to the companion part by the effect of inertia thereon, said yieldingly supported part being normally movable close to but freely relative to the friction member, and a normally inactive spring adapted to press the members together, said two-part member having wedge means whereby when the two parts are moved relatively by the effect of inertia the parts are wedged apart so as to bring the yieldingly supported part into engagement with the friction member and thereby cause them to be further wedged apart to cause frictional engagement with the friction member under the full pressure of the spring.

In testimony whereof, I hereunto affix my signature.

ROBERT E. KIMBALL.